United States Patent [19]
Frankel et al.

[11] Patent Number: 5,645,134
[45] Date of Patent: Jul. 8, 1997

[54] ENGINE ENCLOSURE ASSEMBLY

[75] Inventors: David B. Frankel, Cary, N.C.; Scott E. Jeffers, Peoria, Ill.; John E. Myslik, Holly Springs, N.C.

[73] Assignee: Caterpillar Inc., Peoria, Ill.

[21] Appl. No.: 557,913

[22] Filed: Nov. 14, 1995

[51] Int. Cl.⁶ .................................................. B62D 25/10
[52] U.S. Cl. ........................................ 180/69.24; 16/277
[58] Field of Search ............................... 180/69.2, 69.21, 180/69.24; 16/277, 286, 289, 304; 296/76

[56] References Cited

U.S. PATENT DOCUMENTS

| | | | |
|---|---|---|---|
| 1,155,321 | 9/1915 | Fulterman | 180/69.2 |
| 1,454,595 | 5/1923 | Ashley | 180/69.2 |
| 2,294,459 | 9/1942 | Joachim | 16/135 |
| 2,311,965 | 2/1943 | Reynolds | 180/69.2 |
| 2,341,847 | 2/1944 | Roethel | 16/135 |
| 2,543,600 | 2/1951 | Roethel | 16/135 |
| 2,672,942 | 3/1954 | Bagley | 180/69.2 |
| 2,952,328 | 9/1960 | Steiner | 180/69 |
| 3,767,001 | 10/1973 | Chupick | 180/69 |
| 4,125,170 | 11/1978 | Botz | 180/69 |
| 4,688,844 | 8/1987 | Hirose et al. | 296/76 |
| 4,966,403 | 10/1990 | Nordstrom | 296/76 |
| 5,215,157 | 6/1993 | Teich | 180/69.24 |

*Primary Examiner*—Richard M. Camby
*Attorney, Agent, or Firm*—Claude F. White

[57] ABSTRACT

An engine enclosure assembly for enclosing an engine area of a work machine includes a first fixed horizontal top enclosure and a second horizontal top enclosure which is hinged and moveable between a first closed position and a second open position. First and second hinges are connected to the second top enclosure and first and second opening devices are connected directly to the respective first and second hinges for opening the second top enclosure and for holding it in the open position.

6 Claims, 3 Drawing Sheets

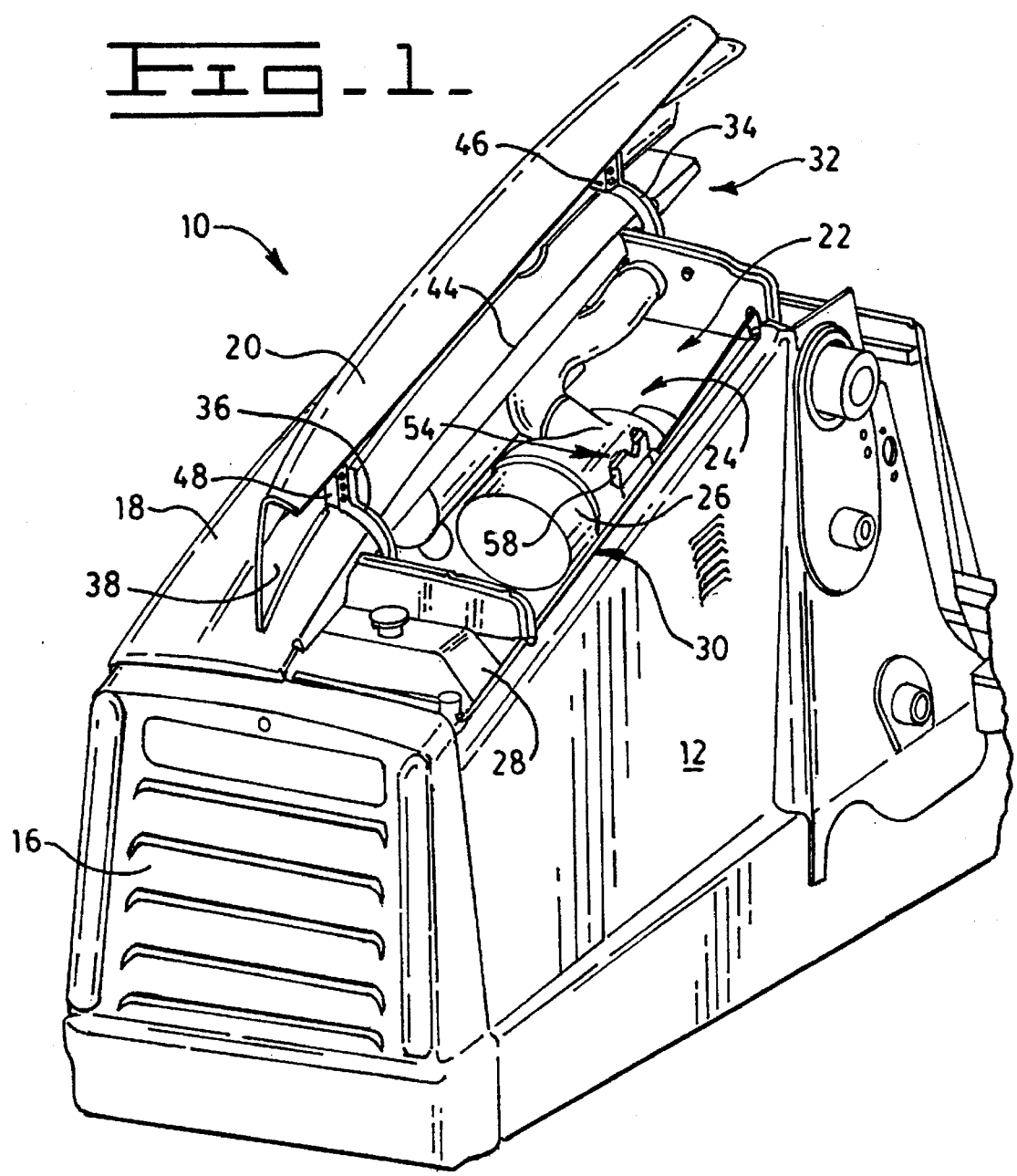

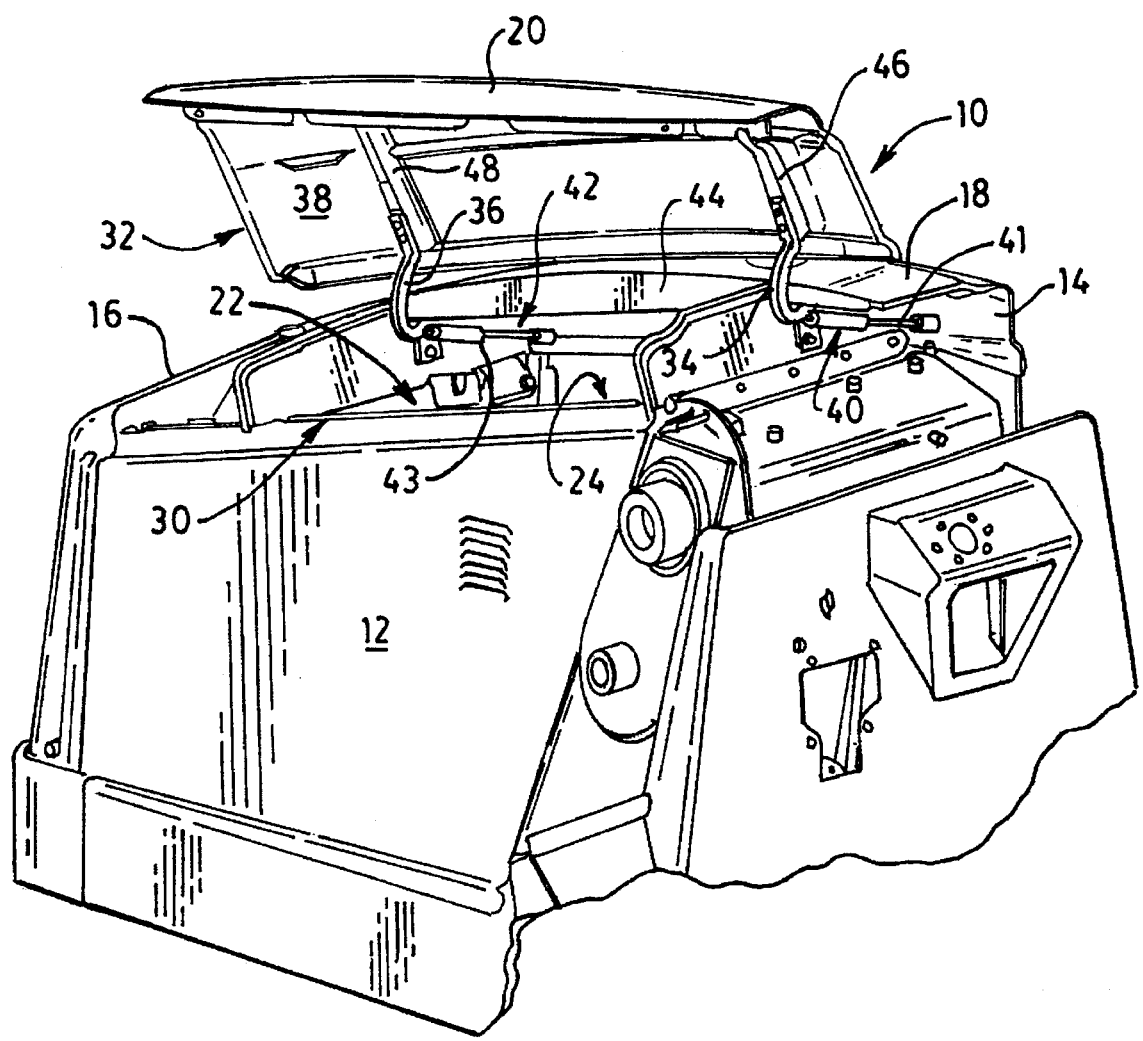

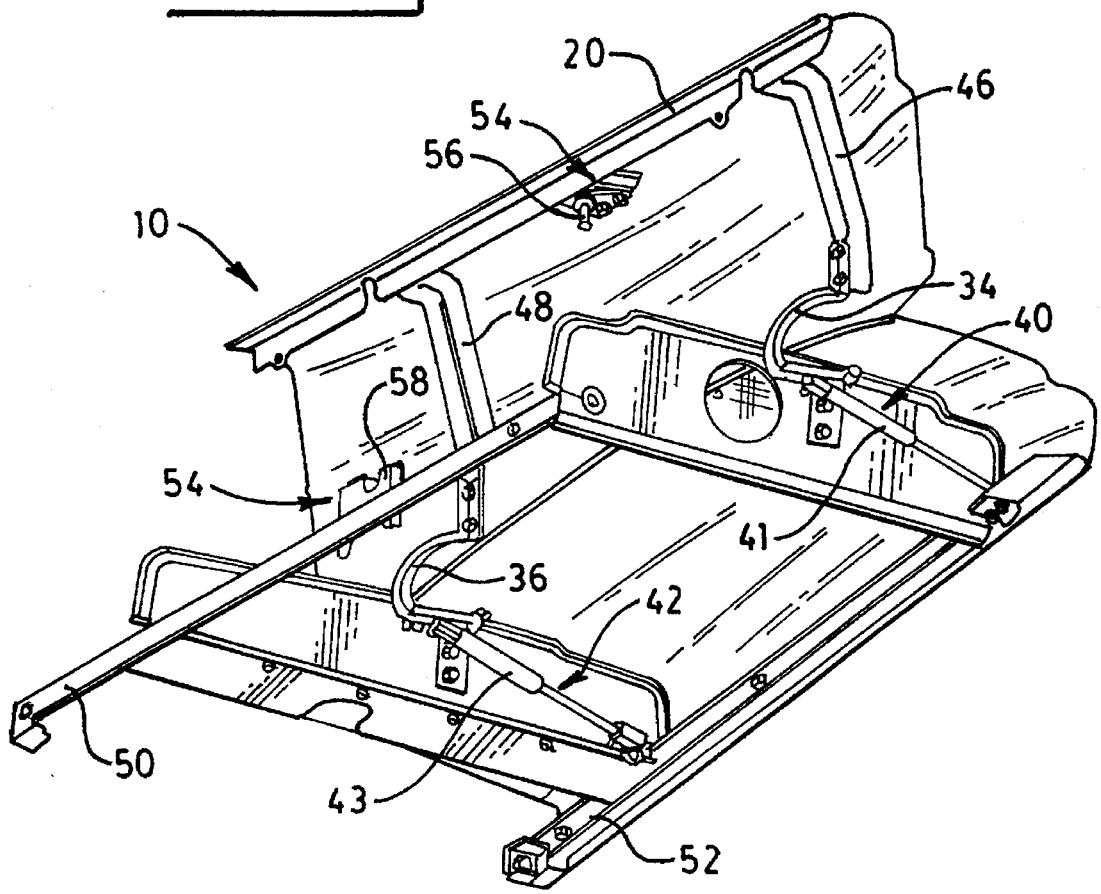

ENGINE ENCLOSURE ASSEMBLY

TECHNICAL FIELD

This invention relates generally to an engine enclosure assembly and more particularly to such an engine enclosure assembly having a hinge portion and a fixed portion.

BACKGROUND ART

Earthmoving and construction machines have multi-paneled enclosures and doors for enclosing the engine or power plant of the machine. Many of these panels and doors are adapted to be opened or removed for daily and periodical checking and servicing of the engine and various engine and machine fluids. This requires a plurality of hinges, latches, and retaining pins for supporting the panels and doors when in the open and closed positions. Some of these access doors require special tools or wrenches to release and or secure the retaining pins holding the access doors in place.

The present invention is directed to overcoming one or more of the problems as set forth above.

DISCLOSURE OF THE INVENTION

In one aspect of the invention, an engine enclosure assembly for a work machine includes first and second vertical side panels, a vertical front panel, and first and second horizontal top enclosures. The first top enclosure is substantially fixed and the second top enclosure is moveable between a first closed position and a second open position. The second top enclosure is moveable by first and second hinges and first and second opening devices connected to the respective first and second hinges.

Most work machines require daily checking and servicing of engine and power fluids, such as engine oil, transmission fluid, and air cleaners and filters. Additionally, periodical checking and servicing of brake reservoirs, radiator fluid levels, and air cleaner elements is also required. Most of these service points are located within or adjacent the engine compartment and are accessed by opening and/or removing a plurality of access doors or panels. Many of these access doors require special tools to loosen and re-attach the pins and fasteners securing the access doors. These tools must be stored in a convenient location to be available when needed.

The subject engine enclosure assembly offers a solution to the above noted problems by providing access to most of the machine service points from a single hinged top enclosure which is opened and held in the open position by first and second opening devices connected directly to the hinges.

BRIEF DESCRIPTION OF THE DRAWINGS

FIG. 1 is a diagrammatic front perspective view of an engine enclosure assembly of the subject invention, with the top enclosure in open position;

FIG. 2 is a diagrammatic rear perspective view of an engine enclosure assembly of the subject invention; and FIG. 3 is a diagrammatic perspective view of the subject enclosure from beneath with the top enclosure in the open position.

BEST MODE FOR CARRYING OUT THE INVENTION

With reference to the drawings, an engine enclosure assembly 10 for a work machine (not shown) includes a substantially vertical first side panel 12, a substantially vertical second side panel 14, a substantially vertical front enclosure 16, a substantially horizontal first top enclosure 18, and a substantially horizontal second top enclosure 20. The first and second side panels 12,14 and the front enclosure 16 define an area 22 which houses an engine 24, an air cleaner assembly 26, a heat exchanger 28, and other machine components. The first and second top enclosures 18,20 are adapted to enclose or cover the area 22. The first top enclosure 18 is substantially fixed, or non-moveable, and the second top enclosure 20 is moveable between a first closed position 30 and a second open position 32. First and second spaced apart hinges 34,36 are connected to the underside 38 of the second top enclosure 20 and first and second spaced apart opening devices 40,42 are connected directly to the respective first and second hinges 34,36 for opening the second top enclosure 20. Preferably, the first and second opening devices 40,42 include first and second gas powered struts 41,43.

Each of the first and second top enclosures 18,20 is adapted to enclose, or cover, about one-half of the engine housing area 22, with a horizontal joint 44 therebetween. The joint 44 is positioned substantially centrally of the engine housing area 22. First and second support bars 46,48 are connected to the underside 38 of the second top enclosure 20 and the first and second hinges 34,36 are connected to the respective first and second support bars 46,48. The engine enclosure assembly 10 further includes first and second spaced apart support rails 50,52 and the first and second opening devices 40,42 are connected between the second support rail 52 and the respective first and second hinges 34,36. When the second top enclosure 20 is closed, a latch assembly 54 holds the second top enclosure 20 closed. The latch assembly 54 includes a first latch portion 56 connected to the second top enclosure 20 and a second latch portion 58 connected to the second vertical side panel 14.

INDUSTRIAL APPLICABILITY

With reference to the drawings and the previous detailed description, the subject engine enclosure assembly 10 is particularly useful for enclosing an area 22 which houses an engine 24 and other machine and engine related compartments, such as an air cleaner 26 and a heat exchanger 28. The second top enclosure 20 of the engine enclosure assembly 10 is adapted to be opened to gain access to the engine 24 and the other compartments for daily and periodical checking of the engine oil, transmission fluid, the air cleaner, and the hydraulic fluids. The fill spouts and fill openings for the various machine fluids are also accessible when the second top enclosure 20 is open.

A latch assembly 54 holds the second top enclosure 20 closed and is released from within the operator's compartment of the machine. Once the latch assembly is released, the second top enclosure is raised with the assistance of the first and second gas powered struts 41,43. The struts 41,43 are connected directly to the first and second hinges 34,36, which are connected to the second top enclosure 20. The first and second gas powered struts 41,43 hold the second top enclosure in the open raised position. When the servicing of the components within the area 22 has been completed, the second top enclosure 20 is closed by hand and held closed by the latch assembly 54.

Other aspects, objects and advantages of this invention can be obtained from a study of the drawings, the disclosure, and the appended claims.

We claim:

1. An engine enclosure assembly for a work machine, comprising:

a substantially vertical first side panel;

a substantially vertical second side panel;

a substantially vertical front enclosure;

a substantially horizontal first top enclosure;

a substantially horizontal second top enclosure, said first and second top enclosures adapted to enclose the area defined by said first and second side panels and said front enclosure, said first top enclosure being substantially fixed and said second top enclosure being moveable between a first closed position and a second open position;

first and second hinges connected to said second top enclosure; and first and second opening devices connected directly to said respective first and second hinges.

2. An engine enclosure assembly, as set forth in claim 1, wherein each of said first and second top enclosures is adapted to enclose about one-half of the area defined by said first and second side panels and said vertical front enclosure, said first and second top enclosures defining a horizontal joint therebetween, said joint being positioned substantially centrally of said engine enclosure area.

3. An engine enclosure assembly, as set forth in claim 1, wherein said first and second opening devices include first and second gas powered struts.

4. An engine enclosure assembly, as set forth in claim 1, including a latch assembly, said latch assembly having a first portion connected to said second top enclosure and a second portion connected to said second vertical side panel.

5. An engine enclosure assembly, as set forth in claim 1, including first and second support bars connected to said second top enclosure, said first and second hinges being connected to said respective first and second support bars.

6. An engine enclosure assembly, as set forth in claim 3, including first and second support rails, said first and second gas powered struts being connected between said second support rail and said respective first and second hinges.

* * * * *